United States Patent
Thomas

(10) Patent No.: US 8,538,027 B2
(45) Date of Patent: Sep. 17, 2013

(54) STORAGE OF KEYID IN CUSTOMER DATA AREA

(75) Inventor: Lintu Thomas, Fremont, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 613 days.

(21) Appl. No.: 12/580,918

(22) Filed: Oct. 16, 2009

(65) Prior Publication Data

US 2011/0093720 A1 Apr. 21, 2011

(51) Int. Cl.
*H04L 29/06* (2006.01)

(52) U.S. Cl.
USPC .......................... 380/277; 380/278; 713/189

(58) Field of Classification Search
USPC .................... 713/189; 380/277–278
See application file for complete search history.

(56) References Cited

U.S. PATENT DOCUMENTS

| 6,101,604 | A  | * | 8/2000 | Barton | 713/176 |
| 2005/0283620 | A1 | * | 12/2005 | Khulusi et al. | 713/185 |
| 2006/0075228 | A1 | * | 4/2006 | Black et al. | 713/167 |
| 2008/0065665 | A1 | * | 3/2008 | Pomroy et al. | 707/101 |
| 2010/0036863 | A1 | * | 2/2010 | Koifman et al. | 707/101 |
| 2010/0042984 | A1 | * | 2/2010 | Daftardar | 717/168 |

* cited by examiner

*Primary Examiner* — Joseph P. Hirl
*Assistant Examiner* — Chi Nguy
(74) *Attorney, Agent, or Firm* — Wong, Cabello, Lutsch, Rutherford & Brucculeri, L.L.P.

(57) ABSTRACT

A key identifier for an encryption key repository is stored with customer data on a logical device. When the customer data is compressible, the key identifier is stored in space freed by compressing the customer data. When the customer data is not compressible, a portion of the customer data is copied to a key record in the key repository identified by the key identifier, and the key identifier overwrites the copied customer data.

21 Claims, 9 Drawing Sheets

STORAGE OF KEYID IN CUSTOMER DATA AREA

TECHNICAL FIELD

The present invention relates to the field of computers, and in particular to a technique for storing encryption keys.

BACKGROUND ART

Managing operational risk by protecting valuable digital assets has become increasingly critical in modern enterprise information technology (IT) environments. In addition to achieving compliance with regulatory mandates and meeting industry standards for data confidentiality, IT organizations must also protect against potential litigation and liability following a reported breach.

In the context of data center fabric security, operators of Storage Area Networks (SANs) have desired fabric-based encryption services to secure data assets either selectively or on a comprehensive basis.

Most sensitive corporate data is stored in the data center, and the vast majority of data from critical applications resides in a SAN, enabling organizations to employ the intelligence of the storage fabric as a centralized framework in which to deploy, manage, and scale fabric-based data security solutions.

The storage fabric enables centralized management to support various aspects of the data center, from server environments and workstations to edge computing and backup environments, providing a place to standardize and consolidate a holistic data-at-rest security strategy. Organizations can also implement data-at-rest encryption in other parts of the data center, helping to protect data throughout the enterprise.

Most current industry solutions include either host-based software encryption, device-embedded encryption, or edge encryption, all of which provide isolated services to specific applications but typically cannot scale across extended enterprise storage environments.

Some solutions have provided centralized encryption services that employ key repositories such as provided by several vendors. These key repositories can be considered specialized secure databases of the encryption keys used by the SAN for encrypting data at rest on the media controlled by the SAN. Each key stored by the key repository is associated with a key identifier (keyID) that can be used to obtain the key from the key repository.

In addition, operators of SANs have a need from time to time to move customer data from one logical unit (LUN) to another. If the data being moved is encrypted, operators have desired a way of keeping track of the keyID corresponding to that LUN, without the expense and performance impacts of an external database associating keyIDs with LUNs, which would increase I/O costs and also increase risks of data inconsistencies should the bookkeeping necessary to keep the external database accurate fail.

SUMMARY OF INVENTION

In one embodiment, a method is disclosed. The method comprises copying a first customer data from a first portion of a customer data area of a logical device to an encryption key record of a key repository corresponding to a key identifier; and overwriting the first customer data in the first portion of the customer data area with the key identifier.

In another embodiment, a method is disclosed. The method comprises reading a first customer data from a first portion of a customer data area of a logical device; checking for a signature data in a first portion of the first customer data; extracting a key identifier corresponding to an encryption key record in a key repository from the first portion of the first customer data if the signature data is found in the first portion of the first customer data; decompressing a second portion of the first customer data; and replacing the first customer data with the decompressed second portion of the first customer data.

In yet another embodiment, a method is disclosed. The method comprises reading a sequence of customer data areas from a first portion of a logical device; checking for a signature data in each of the sequence of customer data areas until one of the sequence of customer data areas contains the signature data; extracting a key identifier corresponding to an encryption key record in a key repository from a first portion of the one of the sequence of customer data areas; decompressing a second portion of the one of the sequence of customer data areas; and replacing the one of the sequence of customer data areas with the decompressed second portion.

In yet another embodiment, a network device is disclosed. The network device comprises a processor; a program storage device, coupled to the processor, configured to store instructions that when executed by the processor cause the processor to perform actions. The actions comprise copying a first customer data from a first portion of a customer data area of a logical device to an encryption key record of a key repository corresponding to a key identifier; and overwriting the first customer data in the first portion of the customer data area with the key identifier.

In yet another embodiment, a network device is disclosed. The network device comprises a processor; a program storage device, coupled to the processor, configured to store instructions that when executed by the processor cause the processor to perform actions. The actions comprise reading a first customer data from a first portion of a customer data area of a logical device; checking for a signature data in a first portion of the first customer data; extracting a key identifier corresponding to an encryption key record in a key repository from the first portion of the first customer data if the signature data is found in the first portion of the first customer data; decompressing a second portion of the first customer data; and replacing the first customer data with the decompressed second portion of the first customer data.

In yet another embodiment, a system is disclosed. The system comprises a logical device and a network device, communicatively coupled with the logical device. The logical device comprises a first customer data area. The network device comprises a processor; a program storage device, coupled to the processor, configured to store instructions that when executed by the processor cause the processor to perform actions. The actions comprise copying a first customer data from the first customer data area to an encryption key record of a key repository corresponding to a key identifier; and overwriting the first customer data in the first customer data area with the key identifier.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Various embodiments described below provide a way to keep the keyIDs associated with data stored in a logical device in the customer data of the logical device, transparently to the customer's use of the data.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instance of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although the following disclosure is written in the context of a SAN, the scope of the present invention is not limited to a SAN, but includes any type of system in which a key repository is accessed by a key identifier for an encryption key that is associated with media that has been or will be encrypted or decrypted using that key. Furthermore, although the embodiments describe below employ disclosed techniques for generating keyIDs in an encryption switch, the scope of the present invention is not so limited, and includes the use of such techniques in other types of devices, such as hosts or storage devices.

Figure 1:
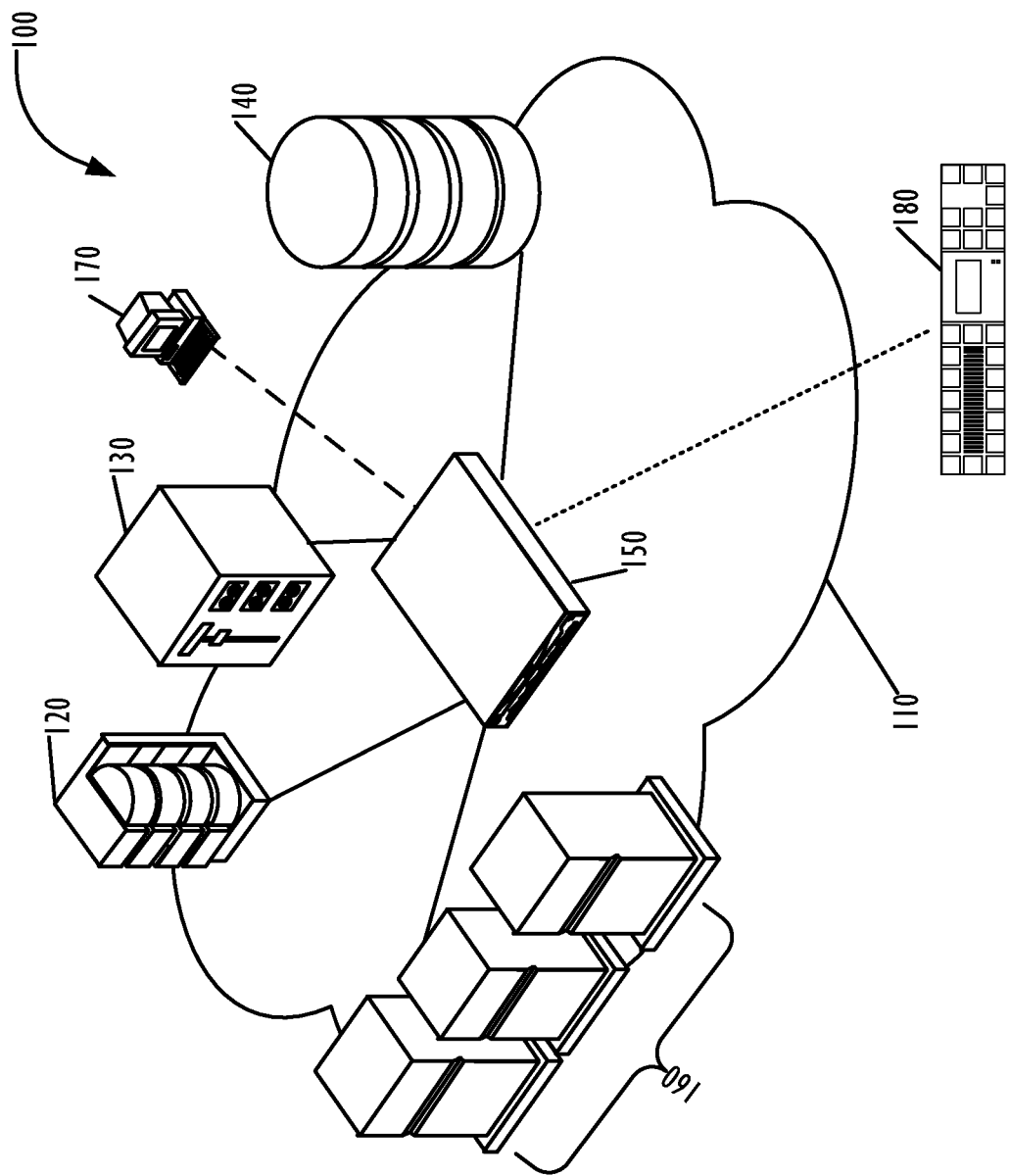
FIG. 1 is block diagram illustrating an architecture for a SAN according to one embodiment.

FIG. 1 is a block diagram illustrating an architecture for a SAN 100 according to one embodiment. As illustrated in FIG. 1, a SAN fabric 110 includes an encryption switch 150, which can interact with the switches, hosts, and storage devices connected to the SAN fabric 110. In this example, the SAN 100 includes a Redundant Array of Independent Disks (RAID) 120, a tape library 130, JBOD ("just a bunch of disks") 140, a switch 150, and a cluster of servers 160. The switch 150, which connects all of the devices connected to the SAN fabric 110, is an encryption switch that can provide encryption/decryption services for the SAN fabric 110, as described in more detail below. Although a single SAN fabric 110 is illustrated in FIG. 1 for clarity of the description, one of ordinary skill in the art will recognize that additional fabrics can be interconnected to the SAN fabric 110, which may span multiple locations, such as a data center, a disaster recovery site, and a branch office.

Other servers or hosts, switches, and storage devices can be used in the SAN 100 illustrated in FIG. 1. The elements shown in FIG. 1 are illustrative and by way of example only, and other elements and other numbers and arrangements of elements, including other numbers of fabrics can be included as desired. In particular, the switch 150 can be a standalone switch, or a blade in a larger backbone switch.

As shown in FIG. 1, the encryption switch 150 provides for data-at-rest encryption of data stored on the RAID array 120, the tape library 130, and the JBOD 140, allowing access to the encrypted data that is stored in the SAN 100. Thus, information about encryption keys must be available to the encryption switch 150. In some embodiments, single elements shown in FIG. 1 may be implemented as redundant components, with two or more redundant elements provisioned into the network for reliability and performance reasons. For example, in a preferred embodiment, the encryption switch 150 can be provisioned as two or more redundant encryption switches 150.

In addition to the elements listed above, a key management system 170 provides for operator control over the encryption services, typically as part of a configuration management system for the SAN 100, which is not described further herein. Furthermore, a key repository 180 provides key management services to encryption switch 150.

In order to provide enterprise-wide consistent and secure encryption keys, the encryption switches 150 uses key services provided by the key repository 180. There are multiple vendors of key repositories 180, each of which may store keys differently and have a different interface for requesting keys from the key repository 180 and storing keys in the key repository 180. Example key repositories 180 include, without limitation, the NetApp Lifetime Key Management Appliance (LKM) from NetApp, the RSA Key Manager (RKM) from RSA, the HP StorageWorks Secure Key Manager from Hewlett-Packard Development Company, L.P., the IBM Tivoli Key Lifecycle Manager (TKLM) from IBM Corporation, and Thales Encryption Manager for Storage (TEMS) from Thales e-Security Inc. The specific protocol used for communicating with a specific vendor's key repository, as well as the techniques used for storing keys internal to the key repository and other internal structure of the key repository is outside the scope of the present invention.

Figure 2:
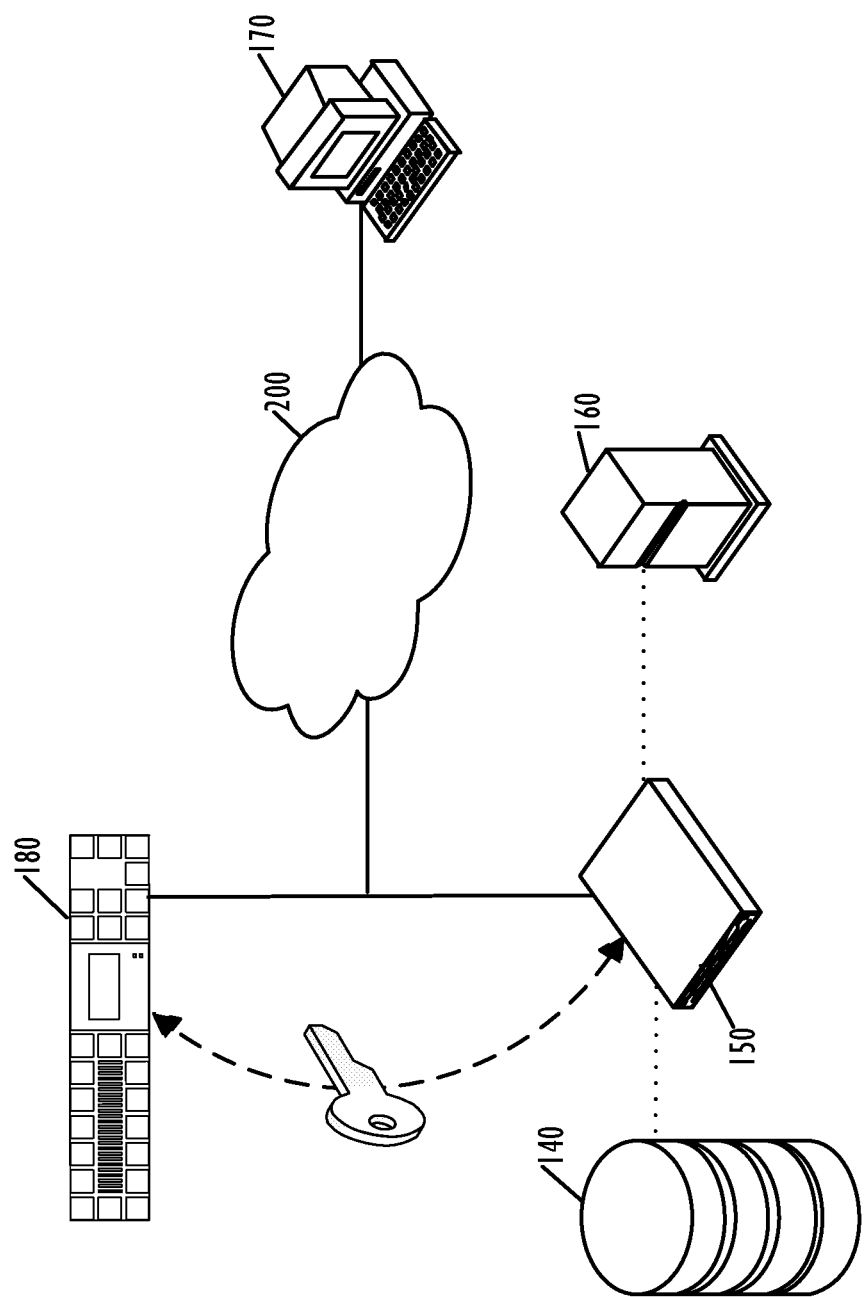
FIG. 2 is a block diagram illustrating an overview of one embodiment of the communication paths used for key management for a system such as is illustrated in FIG. 1.

FIG. 2 is a block diagram illustrating an overview of one embodiment of the communication paths used for key management for a system such as is illustrated in FIG. 1. The embodiment of FIG. 2 illustrates a non-redundant implementation in which a single key repository 180 and a single encryption switch 150 is used for clarity of the description, but embodiments with redundant key repositories 180 and encryption switches 150 are generally preferred for reliability and performance reasons. The dashed lines in FIG. 2 illustrate key data flows, the solid lines are in this embodiment an Ethernet key management local area network (LAN) 200 connecting the encryption switch 150 to the key repository 180 and the key management system 170, and the dotted lines illustrate data flows between an initiator (here, one of the servers 160) and a target (here, a logical device or unit allocated on JBOD 140) on which is stored encrypted information.

The initiator 160 initiates a read or write request to the target 120. Data-at-rest encryption has been used to encrypt the data stored in the logical device 140. The switch fabric 110 carries the request from the initiator 160 to the encryption switch 150. The SAN fabric 110 is typically a Fibre Channel fabric and uses Fibre Channel protocols to pass requests and responses between the initiator 160 and the target 140. The encryption switch 150 encrypts and decrypts the data read from or written to a logical unit (LUN) of the target 140.

At no time does the initiator 160 have access to the key, referred to herein as a Data Encryption Key (DEK), that is used to encrypt or decrypt data stored on the LUN of the target 140. Instead, encrypted data received from the target 140 is decrypted by the encryption switch 150 before transmitting the decrypted data to the initiator 160. In one embodiment, the encryption switch 150 limits access to DEKs to a cryptographic module of the switch 150 in compliance with the standards of Federal Information Processing Standard Publication 140-2 (FIPS 140-2) "Security Requirements for Cryptographic Modules," a copy of which is incorporated by reference herein.

The key repository 180 manages the DEKs, providing the DEKs to the encryption switch 150. The encryption switch 150 does not store the DEKs but obtains them from the key repository 180 as needed.

In addition, a management Local Area Network (LAN) 200, typically an Ethernet LAN, is used to link the management system 170 and the SAN fabric 110 devices, including the encryption switch 150.

Any desired protocol can be used to communicate between the key repository 180 and encryption switch 150. One example of such a protocol is the NetApp OpenKey Application Programming Interface (OpenKey API). Using the OpenKey API, keys that are communicated between the encryption device 150 and the key repository 180 are wrapped (encrypted) in another key before sending them within a Transport Layer Security (TLS) session. The key repository 180 manages the DEKs and performs other tasks related to managing keys for a network.

In a redundant embodiment, DEKs are synchronized between the encryption device 150 through the SAN fabric 110 and interconnected fabrics as necessary. The redundant key repositories 180 also synchronize with each other to ensure access to keys if one key repository 180 fails. These redundant key exchanges attempt to ensure that the data can be encrypted or decrypted without a single point of failure. In such a redundant embodiment, a separate cluster LAN, typically comprised of Gigabit Ethernet (GbE) links between the encryption devices and key repositories, is typically used for exchanging DEKs between the redundant key repositories 180 and encryption switches 150 in a cluster.

As described above, key repositories may be considered as a secure database for storing keys, among other things, using a keyID as the database key for accessing a key record associated with the keyID with information about a given DEK. Thus, in order to obtain a key from the key repository 180, the encryption switch 150 must determine the keyID value that corresponds to the desired key.

Figure 3:
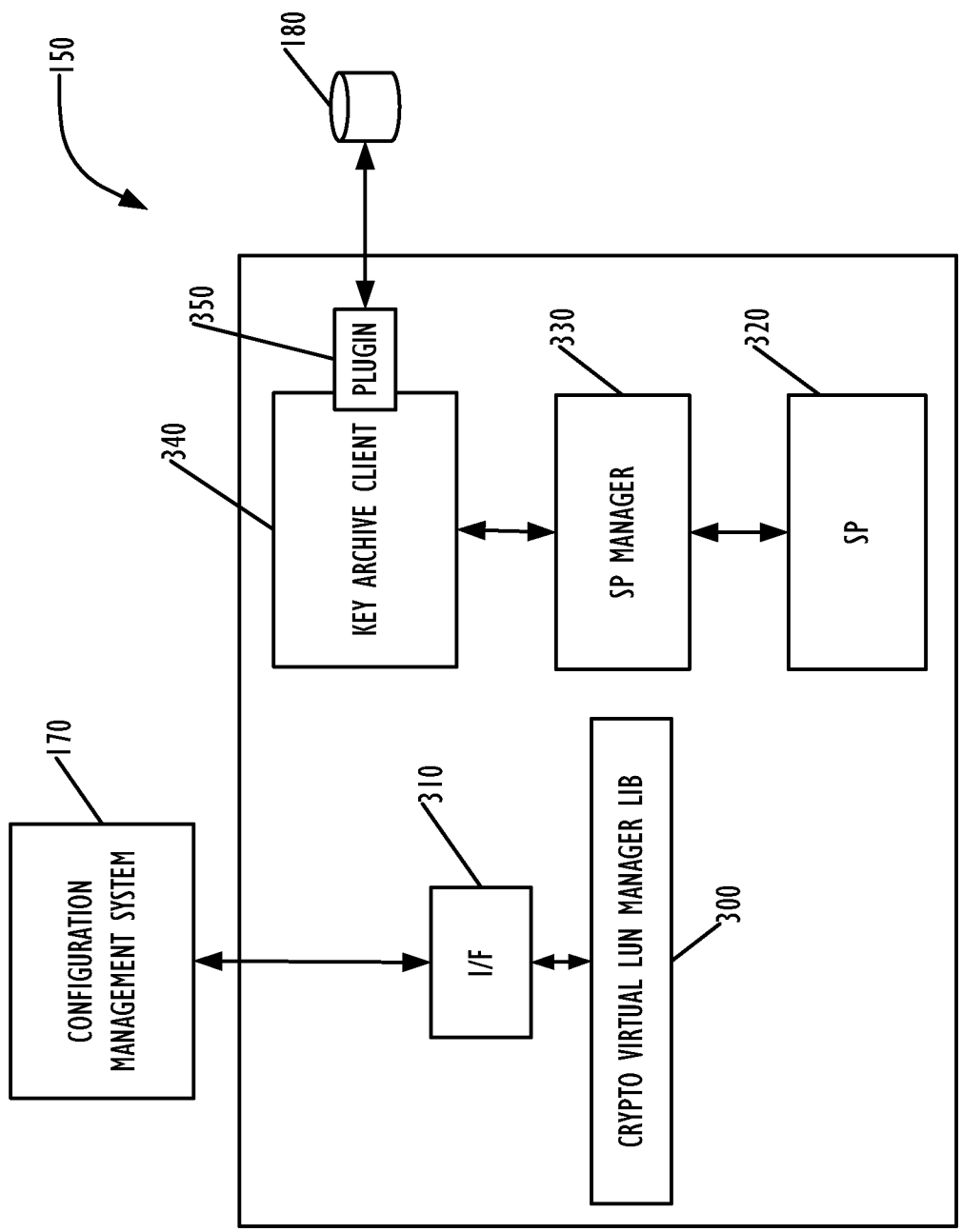
FIG. 3 is a block diagram illustrating a software architecture according to one embodiment of an encryption switch.

FIG. 3 is a block diagram illustrating a software architecture for implementing the above-described techniques according to one embodiment of an encryption switch 150. A user can interact with the encryption switch 150 through a configuration management system 170, typically using a management console that provides users and administrators the ability to execute commands, or run a web based UI. Most operations on keys may be performed from a single management console in one embodiment. Interface modules 310 may provide remote programmatic, command line, or web interfaces between the configuration management system 170 and a crypto/LUN manager module 300 for switch management functions, plus additional interfaces for key operations.

A Key Archive Client (KAC) module 340 provides the encryption switch 150 with a general interface to interact with the various key repositories 180, via specific plug-in modules or adapters 350 that perform the necessary translations for specific key repositories 180. For example, if the key repository 180 is a NetApp LKM repository, then the plugin 350 is an LKM plugin.

A security processor management module 330 provides an interface between a security processor module 320 and the key archive client 340. The security processor module 320 performs key generation, key encryption, and key injection into the cryptographic engines of the encryption switch 150. In one embodiment, the security processor module 320 is a security processor operating system that provides FIPS Level 3 compliance.

Figure 4:
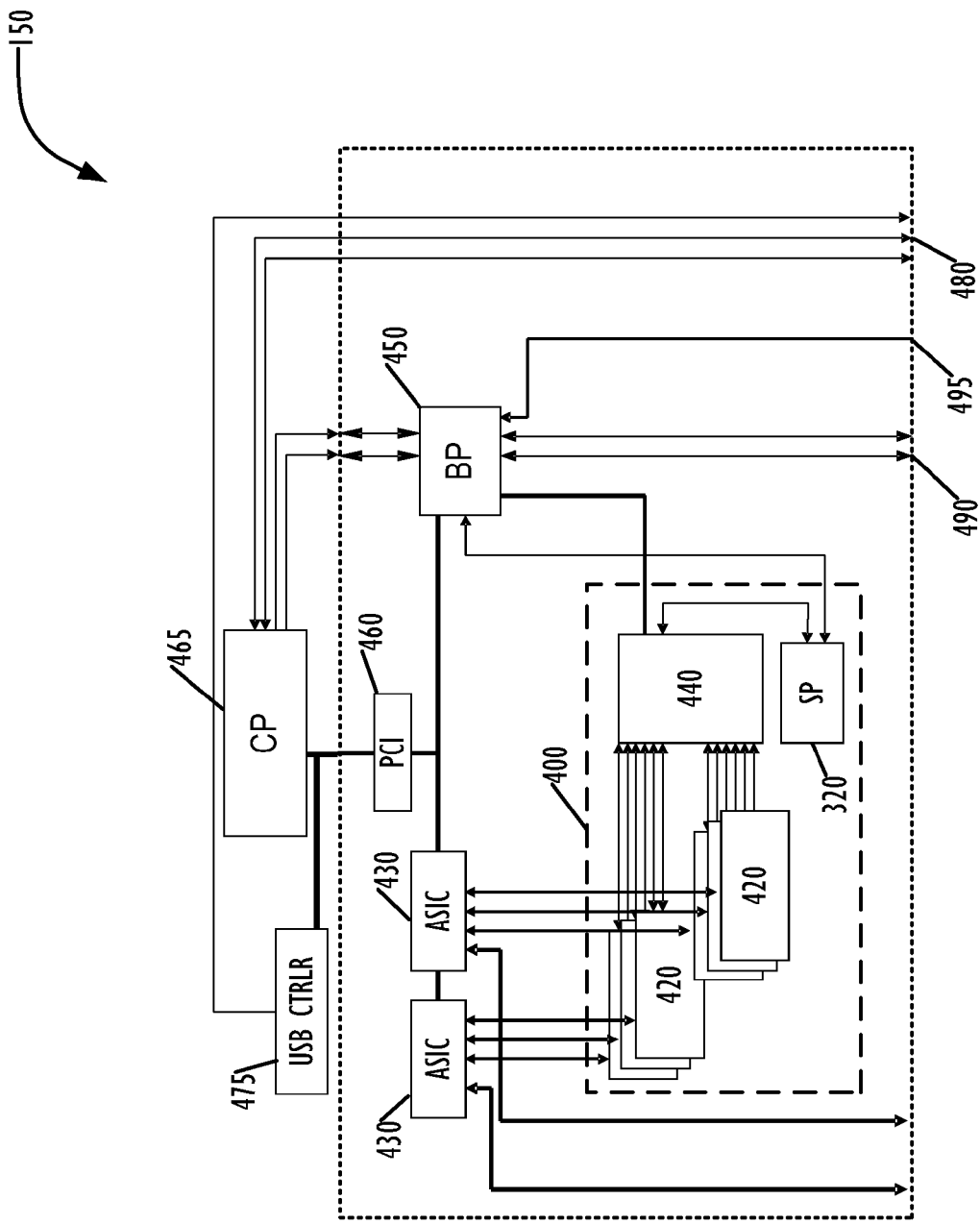
FIG. 4 is a block diagram illustrating major hardware components of an encryption switch according to one embodiment.

Turning to FIG. 4, a block diagram illustrates major hardware components of the encryption switch 150 that execute the software architecture of FIG. 3. The encryption switch 150 may be constructed as a standalone switch or as a blade in a larger data center switch chassis. If the encryption switch 150 is a blade, then the portion of FIG. 4 enclosed in the dotted line may be sufficient, while the additional components may be used for a standalone switch. The dashed line indicates a secure cryptographic module 400, which performs encryption and decryption for the encryption switch 150. The cryptographic module 400 preferably is protected from physical tampering by physical security techniques such as a hardened case and tampering detection hardware that interface with the security processor 320 contained in the cryptographic module 400, so that an attempt to tamper with the cryptographic module 400 will cause the security processor to destroy encryption information contained in the cryptographic module 400, including destruction of encryption key information used for communication with the key repository 180.

According to this embodiment, a plurality of encryption FPGAs 420 that perform the actual algorithms for encryption and decryption of data interact with a pair of Fibre Channel protocol ASICs 430 for transmitting and receiving data from initiators and targets on the SAN 100. A control FPGA 440 controls the operation of the encryption FPGAs 420, and provides an interface to a blade processor 450 and the security processor 320.

The blade processor 450 provides processing capability for the switch operating system, including software for interacting with the key repository 180, such as the key archive client 440. The blade processor 450 also controls Gigabit Ethernet ports 490 and a smart card interface 495 used for authentication purposes. In a standalone switch 150, an additional control processor 450 provides additional control functions for the encryption switch 150, through a PCIe bridge 460, and connections to the blade processor 450. The control processor 465 and a USB controller 475 provide further control for RS232 and 10/100 M Ethernet links 480.

As previously stated, the embodiments described below may be implemented in other types of devices. For example, FIG. 5 illustrates an embodiment in which the techniques are implemented in a host bus adaptor (HBA).

Figure 5:
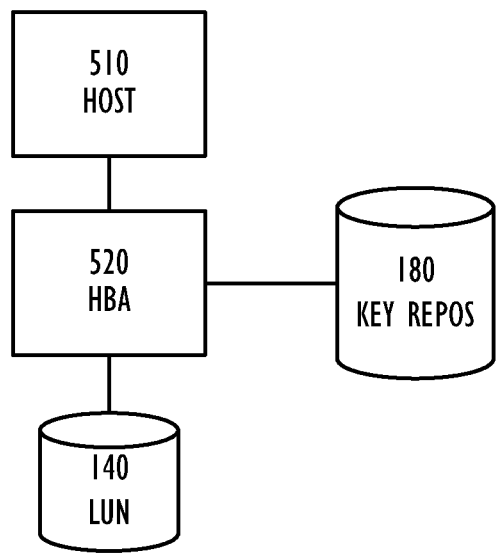
FIG. 5 is a block diagram that illustrates a simplified view of a system according to one embodiment using host bus adaptor (HBA)

FIG. 5 is a block diagram that illustrates a simplified view of a system according to one embodiment using an HBA. A host 510 communicates with a logical device 140 through HBA 520. Although shown as directly connected to the HBA 520 in FIG. 1, the logical device 140 in many embodiments may be physically separated from the HBA 520 by the fabric of a storage area network (SAN), including communications links, routers, switches, and other similar devices, not shown in FIG. 5 for clarity of the drawing. In addition, the logical device may be an allocation of a larger physical device (not shown). The nature of the physical connection between the HBA 520 and the logical device 140 is outside the scope of the present invention and is not further discussed herein.

In addition to the host 510, HBA 520, and logical device 140, FIG. 5 illustrates the use of a key repository 180, similar to the embodiment of FIG. 2. The key repository 180 provides secure storage for encryption keys that may be used by the HBA 520 to encrypt and decrypt data at rest on the logical device 140. The HBA 520 communicates with the key repository 180 via a communications link, typically a local area network (LAN).

In one embodiment, the HBA 520 provides encryption and decryption services, using a keyID to locate and retrieve an encryption key record in the key repository 180, from which an encryption key can be extracted for use in reading from or writing to the logical device 140.

Figure 6:
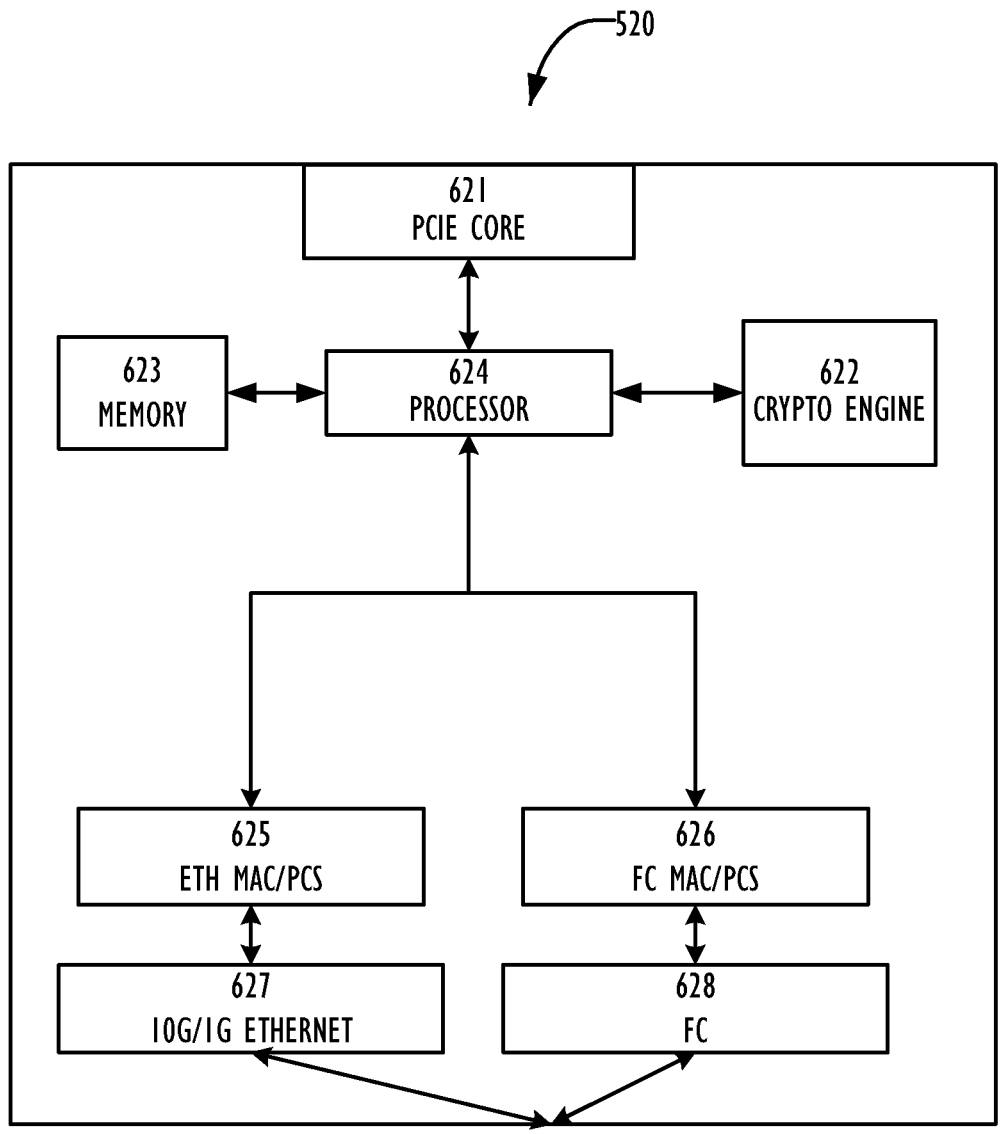
FIG. 6 is a block diagram illustrating a hardware architecture for an HBA according to one embodiment.

FIG. 6 is a block diagram illustrating a hardware architecture for an HBA 520 according to the embodiment of FIG. 5. A PCIe core 621 provides communication capability between the HBA 520 and the host 510. A memory 623 provides storage for a processor 624. A crypto engine 622 is coupled to the processor 624 for handling encryption and decryption. In this embodiment, the HBA 520 is capable of handling both Ethernet and Fibre Channel communication links, using Ethernet MAC 625 and SERDES 627 or Fibre Channel MAC 626 and SERDES 628. In other embodiments, the HBA 520 may handle Ethernet links but not Fibre Channel links, or Fibre Channel links but not Ethernet links, as desired. Other types of communication links can be handled with appropriate replacement of MAC and SERDES elements, as desired.

According to various embodiments, the encryption switch 150 or the HBA 520 may store the keyID value to use in the customer data of the logical device allocated on the target 140, as described in more detail below. For clarity of the discussion, only encryption switch embodiments are discussed below, but the discussion applies to any other device embodying the techniques discussed.

Typically, each vendor of a key repository 180 provides a description of the key record, and attributes or fields in the key record data structure can be used for arbitrary data provided by the encryption switch 150.

In one embodiment, in order to preserve the keyID used for obtaining the encryption key from the key repository with the customer data stored on the logical device 140, the keyID may be stored in the customer data written to the logical device 140. In a further embodiment, depending on the customer data itself, some of the customer data may be copied to the key repository 180, replacing the customer data on the logical device with keyID information, as described in more detail below.

Figure 7:
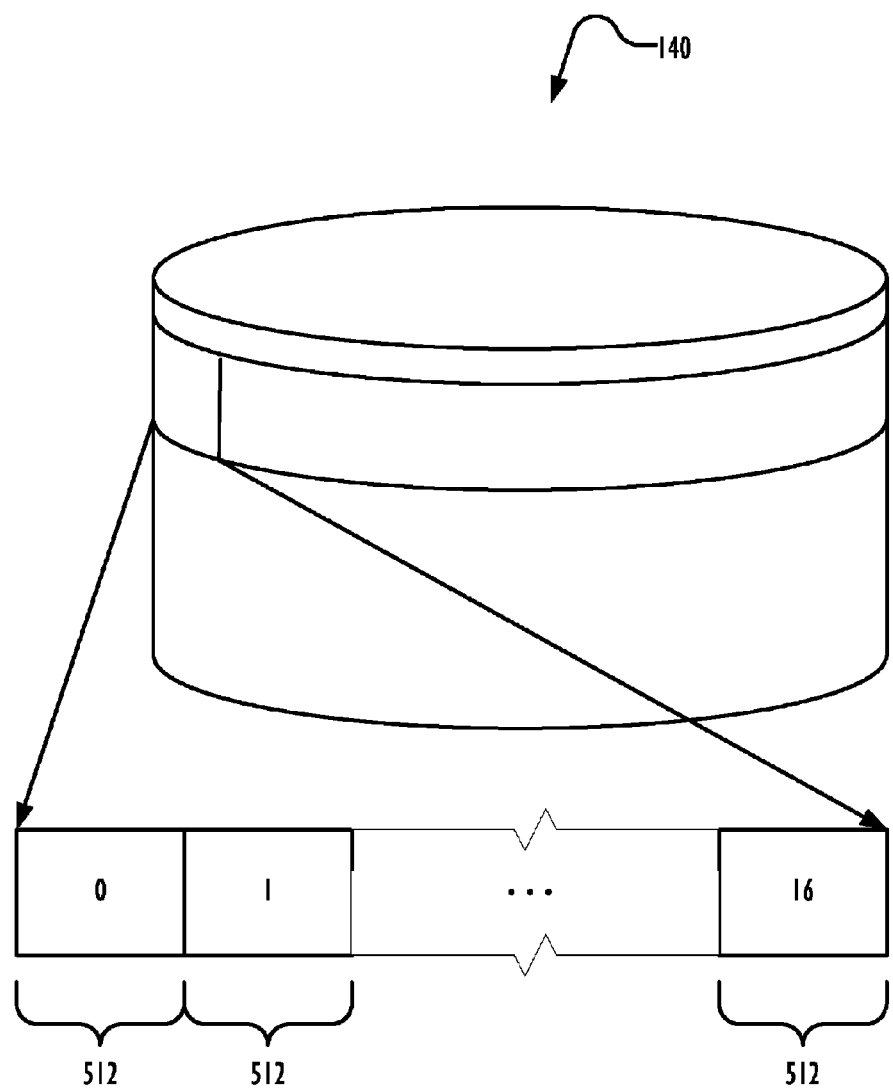
FIG. 7 is a block diagram illustrating a typical logical device 140 according to the prior art.

FIG. 7 is a block diagram illustrating a typical logical device 140 according to the prior art. As with any logical device, the logical device of FIG. 7 (illustrated here as a disc drive) may be physically implemented as a physical device or may be implemented as an allocation of a portion of a larger physical device or devices. For clarity of the drawing, and because the logical device is generally treated as if it were a physical device for the purposes of reading or writing, however, the logical device 140 is illustrated in FIG. 7 as if it were a physical device.

Logical devices, particularly ones used in a SAN, are typically allocated as a collection of fixed size data blocks, typically 512 bytes in size, corresponding to physical device sectors of the same size. These are addressed with a data block number, typically beginning at data block 0. Data blocks 0-16 are illustrated in FIG. 7. In the area illustrated in FIG. 7, data blocks 1-16 hold data written to the logical device 140 using write commands. Data block 0 typically contains information regarding the attributes of the logical device 140, such as the size or number of data blocks allocated to the logical device. Because the attribute data is frequently less than 512 bytes in length, and is written to the beginning of the 512-byte data block 0, the end portion of the data block 0 is often filled out with a string of binary zeros.

In one embodiment, software in the encryption switch 150 may read data blocks 1-16 of the logical device 140, caching the data in memory coupled to a processor of the encryption switch 150. In other embodiments, data block 0 is also read and cached. When needing to store an encryption keyID in the logical device 140, the encryption switch 150 software may examine each of the 16 data blocks of customer data to determine whether the keyID can be stored in one of those data blocks. If the keyID cannot be stored in one of data blocks 1-16, then in one embodiment, a portion of data block 0 may be used to store the keyID, copying the previous contents of that portion of data block 0 to a predetermined attribute of the key record in the key repository identified by the keyID.

Figure 8:
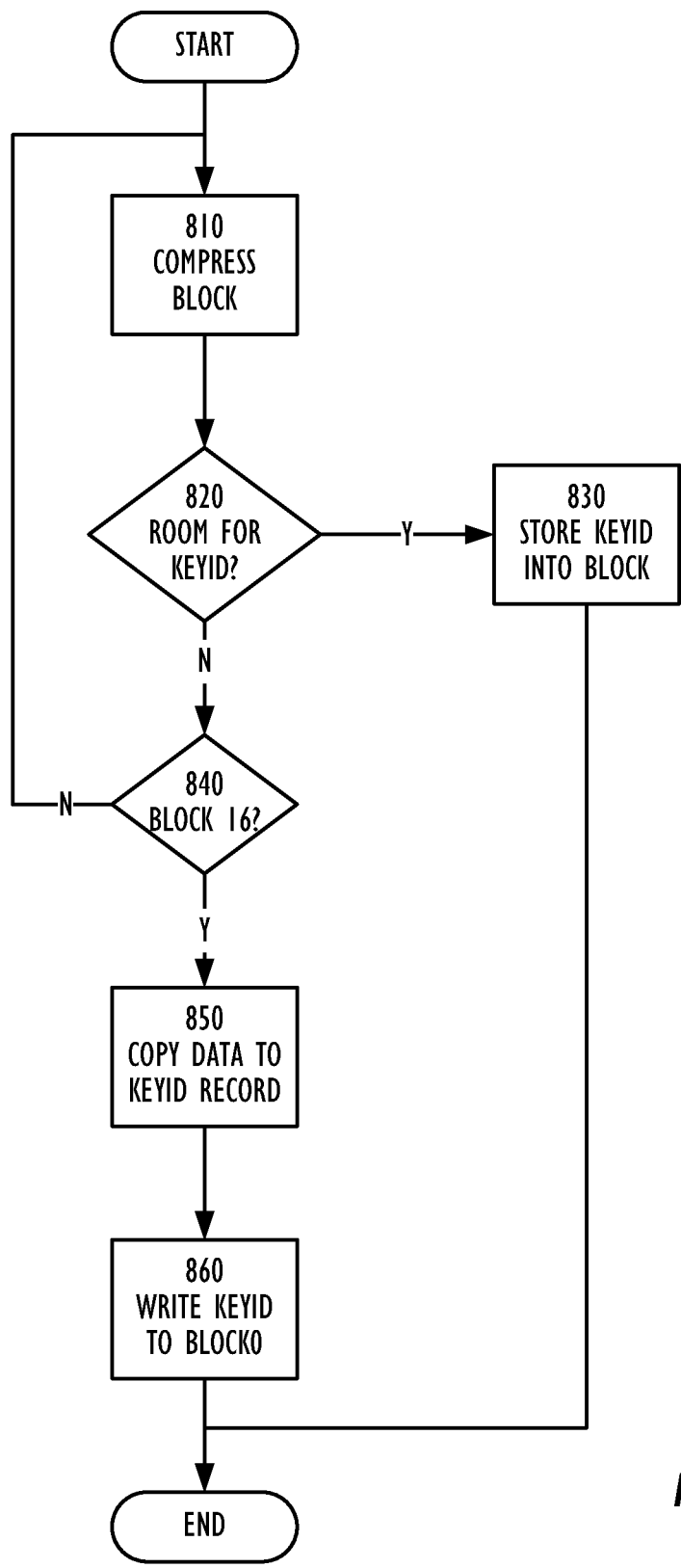
FIG. 8 is a flowchart illustrating a technique for storing a keyID in customer data of a logical device according to one embodiment.

FIG. 8 is a flowchart illustrating a technique for storing a keyID in customer data of the logical device 140 according to one embodiment. In block 810, the customer data in data block 1 (typically already cached by the encryption switch 150) is examined and a compression technique is performed on the data from data block 1 to determine if compression will reduce the size of the customer data sufficiently to leave room for the keyID data. Any desired lossless compression technique may be used. In one embodiment, the gzip compression technique is used. Gzip is based on the well known DEFLATE algorithm, which is a combination of Lempel-Ziv 77 (LZ77) compression and Huffman encoding.

In block 820, the size of the compressed data is evaluated to determine if it is small enough to allow room for the keyID data in the 512-byte data block. In one embodiment, the keyID data uses 32 bytes: 16 bytes for the actual keyID, 8 bytes for a signature data, 4 reserved bytes, and 4 bytes to store the length of the compressed user data. Thus, in this embodiment compression of the user data must compress the user data by at least 32 bytes to allow insertion of the keyID data. Other embodiments may use other keyID data, resulting in a different requirement for compression size reduction.

If the compression of customer data in data block 1 allows room for insertion of the keyID, then in block 830 the keyID data is stored into data block 1 and the data rewritten to the logical device 140. If the compression does not shrink the customer data sufficiently to leave room for the keyID data, then the technique is repeated on data blocks 2-16 sequentially as shown by block 840.

If in block 840 none of the first 16 data blocks of the logical device 140 is compressible sufficiently to store the keyID data, then in block 850 a portion of the data from data block 0 is written to a predetermined attribute or field of the key record in the key repository 180, identified by the keyID. In block 860, the portion of data block 0 copied to the key repository is overwritten by the keyID data.

From then on, whenever the encryption switch 150 needs to read or write encrypted data from or to the logical device 140, the encryption switch 150 may obtain the keyID from the customer data and use it to access the corresponding key record from the key repository 180.

Because future writes of customer data to data blocks 1-16 may change the compressibility of the data, e.g., changing it from non-compressible image data to compressible text data, the technique of FIG. 8 may be repeated any time data is written to data blocks 1-16.

Figure 9:
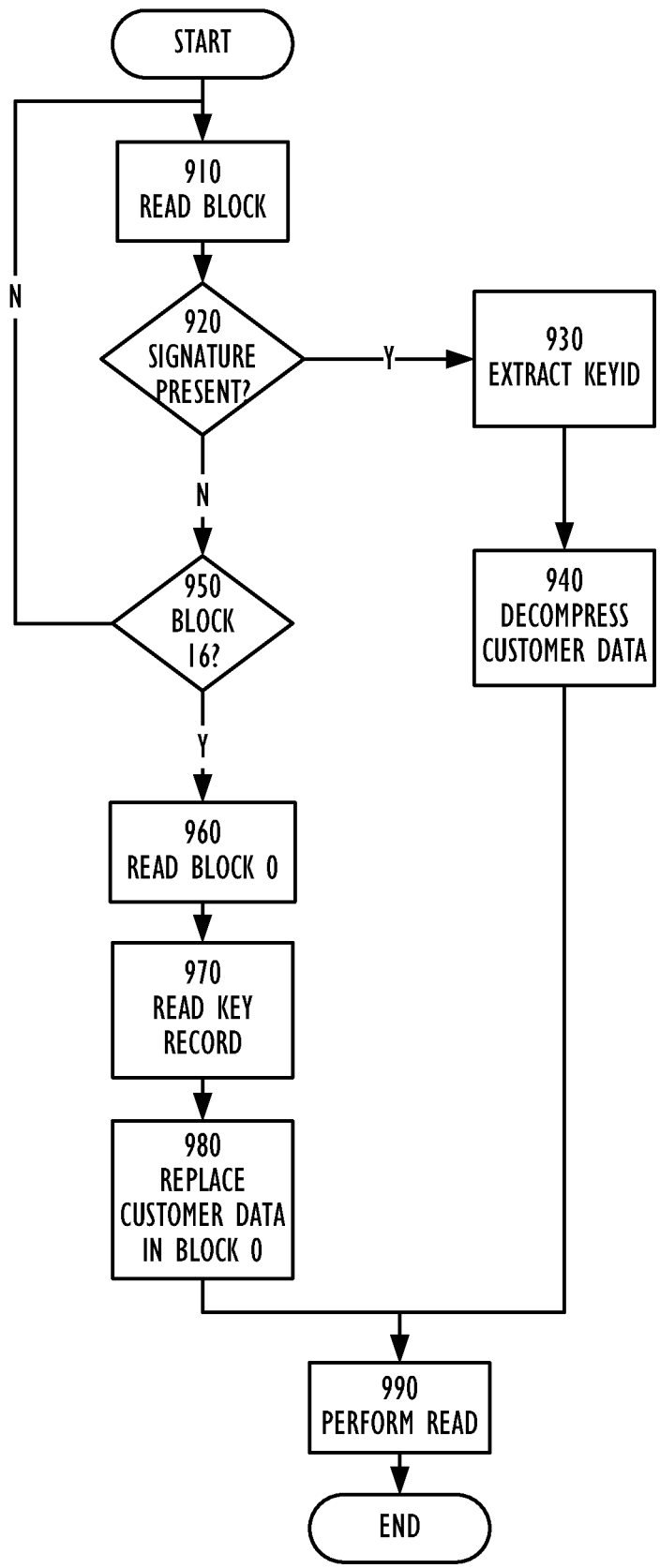
FIG. 9 is a flowchart illustrating a technique for reading data from a logical device according to one embodiment.

FIG. 9 is a flowchart illustrating a technique for reading data from the logical device 140 according to one embodiment. In block 910, the contents of data block 1 (or the next data block in data blocks 1-16) are read, typically from a cached copy maintained in memory 123 of the encryption switch 150. If the signature data is present at the right position in the data block, then the keyID may be considered present in the data block and in block 930, the keyID is extracted.

In block 940, the compressed customer data is decompressed, and the read operation itself is performed in block 990, returning the decompressed customer data if that data block is the data block being read. The keyID extracted in block 930 may then be used by the encryption switch 150 to access the corresponding key record in the key repository 180 for decrypting the data read from the logical device 140.

If the signature is not present in the data block, then in block 950, if the current data block is not data block 16, the actions of blocks 910 and 920 are repeated for the next data block, allowing finding the signature and keyID data in any of data blocks 1-16.

If the signature (and thus, the keyID data) is not found in any of data blocks 1-16, then in block 960 data block 0 of the logical device 140 is read to obtain the keyID. The keyID is then used in block 980 to access the corresponding key record from the key repository, to get the actual customer data from data block 0 that was overwritten by the keyID data, replacing the keyID data in data block 0. Finally, in block 990, the actual real operation is performed, which may use the keyID to obtain the key record from the key repository to allow decryption of the read data.

In another embodiment, instead of copying data from data block 0 to the key repository and overwriting the copied data with the keyID data, data may be copied from and overwritten in one of data blocks 1-16 (or any other selected data block). In such an embodiment, the actions of attempting to compress the data may be omitted, eliminating computational costs for the compression at the cost of additional I/O operations in situations where compression would have been able to provide space to store the keyID data after compression.

In the preceding description, the use of blocks 1-16 is illustrative and exemplary only. A different portion of the customer data area could be used or the size of the portion of the customer data area where compression is attempted may be larger or smaller than 16 blocks as desired.

By providing a place to store the keyID in the customer data, either by compressing the customer data or by copying a portion of the customer data to the key repository record corresponding to a keyID then overwriting that portion of the customer data, the keyID data may be kept with the customer data when the customer data is moved or copied to another logical or physical device, without loss of the keyID data or requiring any bookkeeping in an external data store.

While certain exemplary embodiments have been described in details and shown in the accompanying drawings, it is to be understood that such embodiments are merely illustrative of and not devised without departing from the basic scope thereof, which is determined by the claims that follow.

I claim:

1. A method, comprising:
   copying a first customer data from a first portion of a customer data area of a logical device to an encryption key record of a key repository corresponding to a key identifier;
   overwriting the first customer data in the first portion of the customer data area with the key identifier;
   compressing a second customer data in a second portion of the customer data area; and
   storing a key identifier data corresponding to the key identifier in the second portion of the customer data area if the act of compressing a second customer data shrinks the size of the second customer data by at least the size of the key identifier data.

2. The method of claim 1, wherein the acts of copying a first customer data and overwriting the first customer data are not performed if the act of storing a key identifier data corresponding to the key identifier in the second portion of the customer data area is performed.

3. The method of claim 2, wherein the act of storing the key identifier data comprises:
   storing the key identifier; and
   storing a signature data.

4. The method of claim 3, wherein the act of storing the key identifier data further comprises:
   storing a length of the compressed second customer data in the second portion of the customer data area.

5. The method of claim 1, further comprising:
   compressing customer data in a sequence of subportions of a second portion of the customer data area until the customer data in one of the sequence of subportions is shrunk by at least the size of the key identifier data; and
   storing a key identifier data corresponding to the key identifier in the one of the sequence of subportions of the second portion of the customer data area.

6. The method of claim 5, wherein the acts of copying a first customer data and overwriting the first customer data are not performed if the act of storing a key identifier data corresponding to the key identifier in the one of the sequence of subportions of the customer data area is performed.

7. The method of claim 5, wherein the act of storing the key identifier data comprises:
   storing the key identifier; and
   storing a signature data.

8. The method of claim 7, wherein the act of storing the key identifier data further comprises:
   storing a length of the compressed customer data in the one of the sequence of subportions of the second portion of the customer data area.

9. The method of claim 1, wherein the act of copying a first customer data comprises:
   obtaining the encryption key record from the key repository;
   writing the first customer data as an attribute of the encryption key record; and
   writing the encryption key record to the key repository.

10. A method, comprising:
    reading a first customer data from a first portion of a customer data area of a logical device;
    checking for a signature data in a first portion of the first customer data;
    extracting a key identifier corresponding to an encryption key record in a key repository from the first portion of the first customer data if the signature data is found in the first portion of the first customer data;
    decompressing a second portion of the first customer data;

replacing the first customer data with the decompressed second portion of the first customer data;
reading a second customer data from a second portion of the customer data area of the logical device;
extracting the key identifier from a first portion of the second customer data;
obtaining the encryption key record from the key repository; and
overwriting the first portion of the second customer data with a portion of the encryption key record.

11. A method, comprising:
reading a sequence of customer data areas from a first portion of a logical device;
checking for a signature data in each of the sequence of customer data areas until one of the sequence of customer data areas contains the signature data;
extracting a key identifier corresponding to an encryption key record in a key repository from a first portion of the one of the sequence of customer data areas;
decompressing a second portion of the one of the sequence of customer data areas;
replacing the one of the sequence of customer data areas with the decompressed second portion;
reading a second customer data from a second portion of the logical device;
extracting the key identifier from a first portion of the second customer data;
obtaining the encryption key record from the key repository; and
overwriting the first portion of the second customer data with a portion of the encryption key record.

12. A network device, comprising:
a processor;
a program storage device, coupled to the processor, configured to store instructions that when executed by the processor cause the processor to perform actions comprising:
copying a first customer data from a first portion of a customer data area of a logical device to an encryption key record of a key repository corresponding to a key identifier;
overwriting the first customer data in the first portion of the customer data area with the key identifier;
compressing a second customer data in a second portion of the customer data area; and
storing a key identifier data corresponding to the key identifier in the second portion of the customer data area if the act of compressing a second customer data shrinks the size of the second customer data by at least the size of the key identifier data.

13. The network device of claim 12, wherein the instructions when executed cause the processor not to perform the actions of copying a first customer data and overwriting the first customer data if the action of storing the key identifier data in the second portion of the customer data area is performed.

14. The network device of claim 12, wherein the key identifier data comprises:
the key identifier; and
a signature data.

15. The network device of claim 12, wherein the key identifier data comprises:
the key identifier;
a signature data; and
a length of the compressed second customer data.

16. A network device, comprising:
a processor;
a program storage device, coupled to the processor, configured to store instructions that when executed by the processor cause the processor to perform actions comprising:
reading a first customer data from a first portion of a customer data area of a logical device;
checking for a signature data in a first portion of the first customer data;
extracting a key identifier corresponding to an encryption key record in a key repository from the first portion of the first customer data if the signature data is found in the first portion of the first customer data;
decompressing a second portion of the first customer data;
replacing the first customer data with the decompressed second portion of the first customer data;
reading a second customer data from a second portion of the customer data area of the logical device;
extracting the key identifier from a first portion of the second customer data;
obtaining the encryption key record from the key repository; and
overwriting the first portion of the second customer data with a portion of the encryption key record.

17. A network device, comprising:
a processor;
a memory coupled to the processor;
a program storage device, coupled to the processor, configured to store instructions that when executed by the processor cause the processor to perform a first sequence of actions comprising:
reading a first customer data from a first portion of a logical device;
extracting a key identifier corresponding to an encryption key record in a key repository from a first portion of the first customer data;
obtaining the encryption key record from the key repository;
overwriting the first portion of the first customer data with a portion of the encryption key record containing customer data;
reading a sequence of customer data areas from a second portion of the logical device;
checking for a signature data in each of the sequence of customer data areas until one of the sequence of customer data areas contains the signature data;
extracting the key identifier from a first portion of the one of the sequence of customer data areas;
decompressing a second portion of the one of the sequence of customer data areas; and
replacing the one of the sequence of customer data areas with the decompressed second portion, and wherein the instructions when executed cause the processor to perform the first sequence of actions only if none of the sequence of customer data areas contains the signature data.

18. A system, comprising:
a logical device, comprising:
a first customer data area; and
a second customer data area;
a network device, communicatively coupled with the logical device, comprising:

a processor;

a program storage device, coupled to the processor, configured to store instructions that when executed by the processor cause the processor to perform actions comprising:

copying a first customer data from the first customer data area to an encryption key record of a key repository corresponding to a key identifier;

overwriting the first customer data in the first customer data area with the key identifier;

compressing a second customer data in the second customer data area; and storing a key identifier data corresponding to the key identifier in the second customer data area if the act of compressing a second customer data shrinks the size of the second customer data by at least the size of the key identifier data.

19. The system of claim 18, wherein the key identifier data comprises:

the key identifier; and a signature data.

20. The system of claim 19, wherein the instructions when executed cause the processor to perform actions further comprising:

reading the second customer data area;

extracting the key identifier from the second customer data area if the second customer data area comprises the signature data; and decompressing a portion of the second customer data area and overwriting the second customer data area with the decompressed portion of the second customer data area if the second customer data area comprises the signature data.

21. The system of claim 18, wherein the instructions when executed cause the processor to perform actions further comprising:

reading the key identifier from the first customer data area;

obtaining the encryption key record corresponding to the key identifier from the key repository;

extracting the first customer data from the encryption key record; and overwriting the key identifier in the first customer data area with the first customer data.

* * * * *